(12) United States Patent
Yamamoto et al.

(10) Patent No.: US 9,951,201 B2
(45) Date of Patent: Apr. 24, 2018

(54) RESIN PARTICLE ASSEMBLAGE, METHOD FOR PRODUCING THE SAME, AND METHOD FOR CONTROLLING PARTICLE SIZE IN RESIN PARTICLE ASSEMBLAGE

(71) Applicant: Soken Chemical & Engineering Co., Ltd., Tokyo (JP)

(72) Inventors: Satoru Yamamoto, Sayama (JP); Aya Kokaya, Sayama (JP); Chie Tsuchiya, Sayama (JP)

(73) Assignee: Soken Chemical & Engineering Co., LTD., Tokyo (JP)

( * ) Notice: Subject to any disclaimer, the term of this patent is extended or adjusted under 35 U.S.C. 154(b) by 517 days.

(21) Appl. No.: 14/363,077

(22) PCT Filed: Dec. 10, 2012

(86) PCT No.: PCT/JP2012/081885
§ 371 (c)(1),
(2) Date: Jun. 5, 2014

(87) PCT Pub. No.: WO2013/089050
PCT Pub. Date: Jun. 20, 2013

(65) Prior Publication Data
US 2014/0350180 A1    Nov. 27, 2014

(30) Foreign Application Priority Data

Dec. 16, 2011    (JP) .................................. 2011-275601

(51) Int. Cl.
*A61L 24/00* (2006.01)
*C08K 5/1535* (2006.01)
(Continued)

(52) U.S. Cl.
CPC .............. *C08K 5/1535* (2013.01); *C08F 2/18* (2013.01); *C08F 20/10* (2013.01); *C08F 220/14* (2013.01); *C08F 2/44* (2013.01)

(58) Field of Classification Search
CPC ......... C08K 5/1535; C08K 5/10; C08L 33/08; C08L 33/10; C08L 9/06; C08L 25/04
(Continued)

(56) References Cited

U.S. PATENT DOCUMENTS 3,480,570 A * 11/1969 Stephenson .............. C08J 9/224
                                                          264/338
4,304,797 A * 12/1981 Spicuzza .................. C08J 9/224
                                                          427/180
(Continued)

FOREIGN PATENT DOCUMENTS

| CN | 101596434 A | 12/2009 |
|---|---|---|
| CN | 101880353 A | 11/2010 |

(Continued)

*Primary Examiner* — Jane L Stanley
(74) *Attorney, Agent, or Firm* — The Webb Law Firm

(57) ABSTRACT

Provided is a method to produce resin particles having a uniform particle size by a suspension polymerization method, and to provide a method for simply producing resin particles having high dispersibility into an organic binder or an organic solvent, wherein a resin particle assemblage comprises a resin particle assemblage in which an ester moiety constituting a sorbitan fatty acid ester having no polyoxyalkylene group is buried in the resin particles, and a large number of sorbitan moieties bonded with the ester moiety exist on a surface of resin particles, and a coefficient of variation (CV value) of a mean particle diameter of the resin particles forming the resin particle assemblage is in the range of 30% or less.

4 Claims, 1 Drawing Sheet

(51) Int. Cl.
*C08F 20/10* (2006.01)
*C08F 2/18* (2006.01)
*C08F 220/14* (2006.01)
*C08F 2/44* (2006.01)

(58) Field of Classification Search
USPC ........................................................ 524/753
See application file for complete search history.

(56) References Cited

U.S. PATENT DOCUMENTS

| | | | |
|---|---|---|---|
| 5,420,218 A | 5/1995 | Toribuchi et al. | |
| 2005/0069801 A1* | 3/2005 | Yamasaki | G03G 9/0804 430/110.2 |
| 2005/0113252 A1* | 5/2005 | Miyake | A61L 15/18 502/402 |
| 2007/0041796 A1* | 2/2007 | Irie | A61L 15/60 407/30 |
| 2009/0169891 A1* | 7/2009 | Higashimoto | A61L 15/24 428/402 |
| 2012/0238705 A1 | 9/2012 | Sekiya | |

FOREIGN PATENT DOCUMENTS

| | | |
|---|---|---|
| JP | 64-069603 | 3/1989 |
| JP | 06-016707 | 1/1994 |
| JP | 06-073106 | 3/1994 |
| JP | 08-059712 | 3/1996 |
| JP | 2000-355639 | 12/2000 |
| JP | 2005-060525 | 3/2005 |
| JP | 2005-146223 | 6/2005 |
| JP | 2007-217645 | 8/2007 |
| JP | 2008-255289 | 10/2008 |
| JP | 2009-249434 | 10/2009 |
| TW | 201124432 A1 | 7/2011 |

* cited by examiner

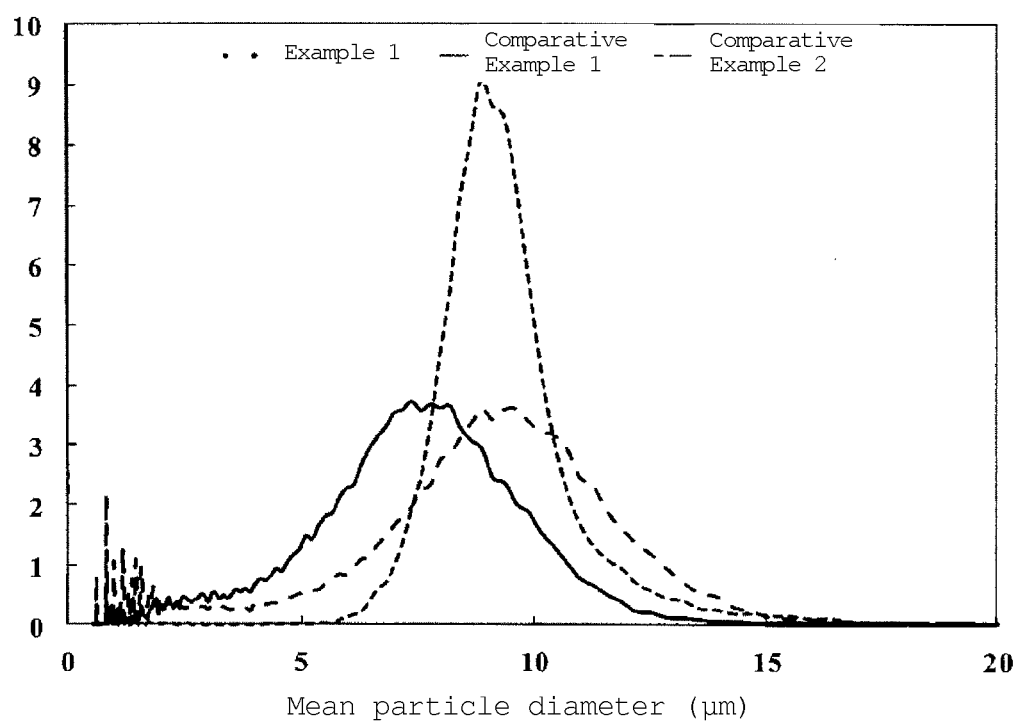

RESIN PARTICLE ASSEMBLAGE, METHOD FOR PRODUCING THE SAME, AND METHOD FOR CONTROLLING PARTICLE SIZE IN RESIN PARTICLE ASSEMBLAGE

CROSS-REFERENCE TO RELATED APPLICATIONS

This application is the United States national phase of International Application No. PCT/JP2012/081885 filed Dec. 10, 2012, and claims priority to Japanese Patent Application No. 2011-275601 filed Dec. 16, 2011, the disclosures of which are hereby incorporated in their entirety by reference.

TECHNICAL FIELD

The present invention relates to a resin particle assemblage, a method for producing the same, and a method for controlling a particle size in the resin particle assemblage. More specifically, the present invention relates to a resin particle assemblage having a uniform particle size, a method for producing the same, and a method for controlling a particle size in the resin particle assemblage.

BACKGROUND ART

Particles of a resin such as an acrylic resin and a styrene resin have been widely used in an application of an optical material, cosmetics, a molding resin, an additive to a coating material, or the like. In each application, a demand has been expressed for resin particles in quality having a uniform particle diameter.

As a production method for obtaining the resin particles having the uniform particle diameter, disclosure has been made as to a production method for classifying resin particles in a wide particle size distribution range as produced by suspension polymerization or spray polymerization, a production method for swelling seeds using seed particles having a controlled particle diameter in seed polymerization, thereby achieving a fixed particle size distribution. However, any of these production methods has needed a plurality of steps, resulting in cost increase and complicated work.

In order to solve these problems, study has been conducted for controlling a dispersion state or a surface state of polymerizable monomer-containing oil liquid in a reaction system in suspension polymerization to give resin particles having a uniform particle diameter. For example, a method is known in which aqueous suspension polymerization is performed in the presence of colloidal silica or alkali metal halide as a suspension stabilizer (Patent Literature 1), suspension polymerization is performed in the presence of hydrophobic inorganic oxide, a hydrophilic organic compound and water-soluble neutral salt (Patent Literature 2), suspension polymerization is performed in the presence of a suspending agent (Patent Literature 3), suspension polymerization is performed in the presence of a sparingly-soluble compound (Patent Literature 4), or the like.

However, these methods have involved problems on treatment of a reaction liquid because a polymerization system contains a metal or an inorganic substance. Moreover, an effect is not obtained unless an amount of addition of an inorganic compound such as silica satisfies a fixed level or more, and therefore silica deposited on a surface of resin particles obtained may occasionally become an obstacle in subsequent processing. In addition thereto, fine particles are generated also in these methods, and a demand has not been satisfied yet.

Moreover, resin particles having excellent dispersibility are also known in which the resin particles are formed by copolymerizing (meth)acrylate ester and a monomer having a carboxyl group, and coated with a nonionic surfactant. However, such particles are obtained through a step for additionally treating a surface of the resin particles, and a plurality of steps are needed for production (Patent Literature 5).

Therefore, desire has been expressed for further efficiently dispersing and stabilizing polymerizable monomer-containing oil droplets in suspension polymerization to give resin particles having good processability and a uniform particle diameter.

CITATION LIST

Patent Literature

Patent literature 1: JP-A-2007-217645
Patent literature 2: JP-A-2000-355639
Patent literature 3: JP-A-H6-16707
Patent Literature 4: JP-A-H6-73106
Patent Literature 5: JP-A-2008-255289

SUMMARY OF INVENTION

An object of the present invention is to provide a resin particle assemblage having a uniform particle size, to produce resin particles having a uniform particle size by a suspension polymerization method, and to provide a method for simply producing particles having high dispersibility into an organic binder or an organic solvent.

A resin particle assemblage according to the present invention includes a resin particle assemblage in which an ester moiety constituting a sorbitan fatty acid ester having no polyoxyalkylene group is buried in the resin particles.

More specifically, the resin particle assemblage according to the present invention has features of the resin particle assemblage in which the ester moiety constituting the sorbitan fatty acid ester having no polyoxyalkylene group is buried in the resin particles, and a large number of sorbitan moieties bonded with the ester moiety exist on a surface of the resin particles.

An HLB value of the above-described sorbitan fatty acid ester is preferably in the range of 1 to 9.

A mean particle diameter of the above-described resin particles is preferably in the range of 0.5 to 1,000 μm.

A main component of a polymerizable monomer constituting the above-described resin particles is preferably a (meth)acryl-based monomer and/or a styrene-based monomer.

Moreover, a method for producing the resin particle assemblage according to the present invention has features of comprising:

a step for adding an aqueous medium to a polymerizable oily composition containing an unsaturated group-containing polymerizable monomer, a polymerization initiator and a sorbitan fatty acid ester having no polyoxyalkylene group, and stirring the resultant mixture under strong stirring to emulsify the polymerizable oily composition into the aqueous medium to prepare an emulsified liquid; and a step for heating the emulsified liquid to allow suspension polymerization of the polymerizable monomer in the polymerizable oily composition.

An HLB value of the above-described sorbitan fatty acid ester is preferably in the range of 1 to 9.

A mean particle diameter of the above-described resin particles is preferably in the range of 0.5 to 1,000 μm.

According to the present invention, suspension polymerization is performed using a sorbitan fatty acid ester having no polyoxyalkylene group, thereby allowing suppression of generation of fine particles without passing through a complicated step to give a resin particle assemblage having a uniform particle size, and to give a resin particle assemblage having high dispersibility into an organic binder and an organic solvent due to polarity, on a surface of particles, originating in the sorbitan fatty acid ester.

BRIEF DESCRIPTION OF THE DRAWING

The drawing is a diagram showing a particle size distribution of a resin particle assemblage in Example 1 in comparison with particle size distributions in Comparative Examples 1 and 2.

DETAILED DESCRIPTION OF THE INVENTION

A resin particle assemblage, a method for producing the same and a method for controlling a particle size in the resin particle assemblage according to the present invention are described below in detail.

[Resin Particle Assemblage]

A resin particle assemblage according to the present invention includes a resin particle assemblage in which an ester moiety constituting a sorbitan fatty acid ester having no polyoxyalkylene group is buried in the resin particles, and a large number of sorbitan moieties bonded with the ester moiety exist on a surface of the resin particles. Moreover, the ester moiety of sorbitan fatty acid ester is buried inside individual resin particles to create a state in which the sorbitan moiety is exposed on the surface of resin particles. In addition, a coefficient of variation (CV value) of a mean particle diameter of resin particles forming the resin particle assemblage according to the present invention is preferably in the range of 30% or less.

The above-described resin particles include a polymer obtained by adding the sorbitan fatty acid ester having no polyoxyalkylene group to an unsaturated group-containing polymerizable monomer and polymerizing or copolymerizing the resultant mixture.

Specific examples of the above-described unsaturated group-containing polymerizable monomer include a (meth)acryl-based monomer, a styrene-based monomer, a functional group-containing monomer, a polyfunctional monomer, a conjugated diene-based monomer, a monomer for forming a polyurethane resin, and polyol, and a (meth)acryl-based monomer or a styrene-based monomer that facilitates production of resin particles is preferably contained as a main component (50 parts by weight or more in a total of the (meth)acryl-based monomer and the styrene-based monomer when a sum total of the unsaturated group-containing polymerizable monomer used is taken as 100 parts by weight). Further specific examples include monomers described below, but the monomers are not limited to the examples below. In addition, "(meth)acryl" herein means methacryl or acryl, "(meth)acrylate" means methacrylate or acrylate, and "(meth)acryloyl" means methacryloyl or acryloyl.

Specific examples of the (meth)acryl-based monomer include:

alkyl(meth)acrylates such as methyl(meth)acrylate, ethyl (meth)acrylate, propyl(meth)acrylate, butyl(meth)acrylate, pentyl(meth)acrylate, hexyl(meth)acrylate, 2-ethylhexyl (meth)acrylate, octyl(meth)acrylate, nonyl(meth)acrylate, decyl(meth)acrylate and dodecyl(meth)acrylate;

cyclic(meth)acrylate such as cyclohexyl(meth)acrylate, isobornyl(meth)acrylate, phenyl(meth)acrylate, benzyl (meth)acrylate and phenoxyethyl(meth)acrylate; and alkoxyalkyl(meth)acrylates such as methoxyethyl(meth) acrylate, ethoxyethyl(meth)acrylate, propoxyethyl(meth) acrylate, butoxyethyl(meth)acrylate and ethoxypropyl (meth)acrylate.

Specific examples of the styrene-based monomers include:

styrene and alkylstyrenes such as methylstyrene, dimethylstyrene, trimethylstyrene, ethylstyrene, diethylstyrene, triethylstyrene, propylstyrene, butylstyrene, hexylstyrene, heptylstyrene and octylstyrene;

halogenated styrenes such as fluorostyrene, chlorostyrene, bromostyrene, dibromostyrene, chloromethylstyrene and iodostyrene;

nitrostyrene; acetylstyrene; methoxystyrene; and α-methylstyrene.

Specific examples of the functional group-containing monomers include:

oxazoline group-containing polymerizable compounds such as 2-vinyl-2-oxazoline, 2-vinyl-5-methyl-2-oxazoline and 2-isopropenyl-2-oxazoline;

aziridine group-containing polymerizable compounds such as (meth)acryloyl aziridine and 2-aziridinylethyl(meth) acrylate;

epoxy group-containing vinyl monomers such as allyl glycidyl ether, (meth)acrylic acid glycidyl ether and 2-ethyl (meth)acrylate glycidyl ether:

hydroxyl group-containing vinyl compounds such as 2-hydroxyethyl(meth)acrylate, 2-hydroxypropyl(meth)acrylate, 2-hydroxybutyl(meth)acrylate and 4-hydroxybutyl (meth)acrylate; monoester of (meth)acrylic acid and polypropylene glycol or polyethylene glycol, and an adduct of lactones with 2-hydroxyethyl(meth)acrylate;

fluorine-containing vinyl monomers such as fluorine-substituted (meth)acrylic acid alkyl ester;

carboxyl group-containing vinyl monomers such as unsaturated carboxylic acid including (meth)acrylic acid, itaconic acid, crotonic acid, maleic acid and fumaric acid, a salt thereof, a (partially) esterified compound and acid anhydride thereof;

reactive halogen-containing vinyl monomers such as 2-chloroethyl(meth)acrylate, 2-chloroethyl vinyl ether, vinyl monochloroacetate and vinylidene chloride;

amide group-containing vinyl monomers such as (meth) acrylamide, N-methylol(meth)acrylamide, N-methoxyethyl (meth)acrylamide and N-butoxymethyl(meth)acrylamide;

organosilicon group-containing vinyl compound monomers such as vinyltrimethoxysilane, 3-methacryloxypropyltrimethoxysilane, allyltrimethoxysilane, trimethoxysilylpropylallylamine and 2-methoxyethoxytrimethoxysilane;

and also macromonomers; a substance having a radically-polymerizable vinyl group at an end of copolymer of the above-described monomer (a fluorine-based macromonomer, a silicon-containing macromonomer, an urethane-based macromonomer); and acrylonitrile; and vinyl acetate.

The above-described functional group monomer is preferably used by allowing copolymerization with a (meth) acryl-based monomer and/or a styrene-based monomer, and may be used in one kind or in combination of a plurality of kinds. In improving dispersibility into the organic binder, in particular, a hydroxy group-containing monomer or an amide group-containing monomer is preferably simultaneously used.

The above-described functional group-containing monomer can be used in an amount of 0.05 to 10 parts by weight, and preferably, 0.1 to 5 parts by weight, in 100 parts by weight of total polymerizable monomers.

Specific examples of the polyfunctional monomers include:

bifunctional monomers such as ethylene glycol di(meth) acrylate, triethylene glycol di(meth)acrylate, tetraethylene glycol di(meth)acrylate, diethylene glycol di(meth)acrylate, polyoxyethylene di(meth)acrylate, neopentyl glycol di(meth)acrylate, 1,4-butanediol di(meth)acrylate, 1,6-hexanediol di(meth)acrylate, 1,9-nonanediol di(meth)acrylate and divinylbenzene;

trifunctional monomers such as trimethylolpropane tri (meth)acrylate, trimethylolethane tri(meth)acrylate, pentaerythritol tri(meth)acrylate, dipentaerythritol tri(meth) acrylate, ethoxylated trimethylolpropane tri(meth)acrylate, propoxylated trimethylolpropane tri(meth)acrylate and tris (2-(meth)acryloxyethyl isocyanurate);

tetrafunctional or higher functional monomers, such as pentaerythritol tetra(meth)acrylate, ethoxylated pentaerythritol tetra(meth)acrylate, propoxylated pentaerythritol tetra (meth)acrylate, dipentaerythritol tetra(meth)acrylate, ethoxylated dipentaerythritol tetra(meth)acrylate, propoxylated dipentaerythritol tetra(meth)acrylate, ditrimethylolpropane tetra(meth)acrylate, ethoxylated ditrimethylolpropane tetra(meth)acrylate and ethoxylated ditrimethylopropane tetra(meth)acrylate;

adducts obtained by addition reaction of glycidol di(meth) acrylate with diisocyanate compounds having an aliphatic group between diisocyanates, such as hexamethylene diisocyanate, trimethylhexamethylene diisocyanate, diisocyanate methylcyclohexane, isophorone diisocyanate and methylenebis(4-cyclohexyl isocyanate), or a diisocyanate compound having an aromatic group, such as diisocyanate methylbenzene and 4,4-diphenylmethane diisocyanate; and dipentaerythritol penta(meth)acrylate and dipentaerythritol hexa (meth)acrylate.

The above-described polyfunctional monomer can be used by allowing copolymerization with a (meth)acryl-based monomer and/or a styrene-based monomer, and may be used in one kind or in combination of a plurality of kinds. Moreover, in view of heat resistance, solvent resistance, working efficiency or the like of the resin particles obtained, the polyfunctional monomer is preferably used in the range of 1 to 50 parts by weight in 100 parts by weight of total polymerizable monomers.

Specific examples of the conjugated diene-based monomers include butadiene, isoprene and chloroprene.

As an example of the monomers forming polyurethane resin, polyol containing glycol as a main component and a diisocyanate raw material can be used, and specific examples include aromatic diisocyanates such as 2,4-tolylene diisocyanate, 2,6-tolylene diisocyanate and p-phenylene diisocyanate, aliphatic diisocyanates, and a bifunctional isocyanate-terminated urethane prepolymer.

Specific examples of the polyol include a diol compound such as ethylene glycol and diethylene glycol, and polyether glycols.

The above-described monomer may be used alone or in combination of a plurality of kinds.

On the surface of resin particles, a large number of sorbitan moieties of sorbitan fatty acid ester exist. The sorbitan fatty acid ester plays a role of a surfactant for dispersing a dispersed phase formed of the polymerizable monomer containing the polymerization initiator or the like into the aqueous medium being a continuous phase. As such a sorbitan fatty acid ester, a compound having no polyoxyethylene group is used.

The above-described sorbitan fatty acid ester having no polyoxyalkylene group preferably has an HLB value in the range of 1 to 9. Specific examples include sorbitan monolaurate (HLB value: 8.6), sorbitan monopalmitate (HLB value: 6.7), sorbitan monostearate (HLB value: 4.7), sorbitan distearate (HLB value: 4.4), sorbitan tristearate (HLB value: 2.1), sorbitan monooleate (HLB value: 4.3), sorbitan trioleate (HLB value: 1.8) and sorbitan sesquioleate (HLB value: 3.7). Among the compounds, a compound having an HLB value in the range of 5 to 9 as typified by sorbitan monolaurate is preferably used.

The above-described sorbitan fatty acid ester may be used alone or in combination of a plurality of kinds.

The above-described sorbitan fatty acid ester also includes a compound having a polyoxyalkylene group bonded to a hydroxyl group of sorbitan fatty acid ester, but the sorbitan fatty acid ester having the polyoxyalkylene group bonded thereto is not used in the present invention because the polyoxyalkylene group is bonded to excessively increase hydrophilicity of sorbitan fatty acid ester to facilitate formation of particles having a small particle diameter in the continuous phase, and thus a dispersion liquid having a uniform particle size is not obtained, and as a result, the resin particle assemblage having the uniform particle size is not obtained.

A mean particle diameter of resin particles forming the resin particle assemblage according to the present invention is preferably in the range of 0.5 to 1, 000 μm, further preferably, in the range of 0.5 to 100 μm, and particularly preferably, in the range of 1 to 50 μm.

The coefficient of variation (CV value) of the mean particle diameter of the resin particle assemblage according to the present invention is in the range of 30% or less, and preferably, in the range of 25% or less.

[Method for Producing Resin Particle Assemblage]

A method for producing a resin particle assemblage according to the present invention has:

a step (hereinafter referred to as "Step (1)") for adding an aqueous medium to a polymerizable oily composition containing an unsaturated group-containing polymerizable monomer, a polymerization initiator and a sorbitan fatty acid ester having no polyoxyalkylene group, and stirring the resultant mixture under strong stirring to emulsify the polymerizable oily composition into the aqueous medium to prepare an emulsified liquid; and a step (hereinafter, referred to as "Step (2)") for heating the emulsified liquid obtained in Step (1), thereby allowing suspension polymerization of the polymerizable monomer in the polymerizable oily composition.

In the above-described production method, a dispersion liquid of resin particles as obtained through the above-described Steps (1) and (2) is passed through a medium removal step using a suction filtration, centrifugal separation, crossflow cleaning device or the like, a drying step applying tray drying, vacuum drying, spray drying or the like, a pulverizing step and so forth, thereby allowing obtaining of an intended resin particle assemblage. In order to further uniformize the particle diameter, when necessary, a classification step may be simultaneously arranged.

In Step (1), the aqueous medium is added to the above-described polymerizable oily composition containing the unsaturated group-containing polymerizable monomer, the polymerization initiator, the sorbitan fatty acid ester having no polyoxyalkylene group and any other arbitrary component to stir the resultant mixture by providing the mixture with stirring force or shearing force using a device having a stirring blade rotation function (for example, a homomixer, an ultrasonic disperser). Then, the emulsified liquid is obtained in which the oil droplets are emulsified into the aqueous medium.

In Step (1), emulsification is preferably made so as to achieve 30% or less in the coefficient of variation (CV value) of the mean particle diameter of resin particles finally obtained. The coefficient of variation can be controlled by a stirring rate, stirring temperature and an amount of addition of sorbitan fatty acid ester having no polyoxyalkylene group.

In Step (1), the stirring rate is preferably in the range of 2 to 30 m/s in terms of peripheral velocity of a stirring blade end, and stirring time is preferably in the range of 0.5 to 120 minutes. As the stirring temperature, stirring is preferably performed at temperature (ordinarily, 20° C.) at which the unsaturated group-containing polymerizable monomer is not polymerized.

An amount of addition of the above-described sorbitan fatty acid ester is ordinarily in the range of 0.1 to 8 parts by weight, and preferably in the range of 0.1 to 5 parts by weight, based on 100 parts by weight of unsaturated group-containing polymerizable monomer.

If the aqueous medium is added to the polymerizable oily composition, and then the components constituting the polymerizable oily composition are emulsified under high-pressure using the homomixer, for example, upon the polymerizable monomer polymerizing to form the particles, the ester moiety constituting the sorbitan fatty acid ester is buried from the surface of resin particles inside the resin particles.

As described above, if the oil droplets are dispersed using the homomixer, the fatty acid ester moiety of sorbitan fatty acid ester gets into oil-droplet particles, and the sorbitan moiety having hydrophilicity aligns on the surface of oil-droplet particles to stably hold the oil-droplet particles.

If an amount of addition of the above-described sorbitan fatty acid ester is within the above-described range, the resin particles having a uniform particle size distribution can be obtained.

A polymerization initiator is used in the method for producing the resin particle assemblage according to the present invention. As the polymerization initiator, a radical polymerization initiator is used. Specific examples of such a radical polymerization initiator include an organic peroxide, an azo-based initiator and any other radical polymerization initiator.

Specific examples of the organic peroxide used herein include cumene hydroperoxide (CHP), di-tert-butyl peroxide, dicumyl peroxide, benzoyl peroxide (BPO), lauroyl peroxide (LPO), dimethyl bis(tert-butylperoxy)hexane, dimethyl bis(tert-butylperoxy)hexyne-3, bis(tert-butylperoxyisopropyl)benzene, bis(tert-butylperoxy)trimethylcyclohexane, butyl-bis(tert-butylperoxy)valerate, 2-ethylhexaneperoxy acid tert-butyl ester, dibenzoyl peroxide, paramenthane hydroperoxide and tert-butyl peroxybenzoate.

Specific examples of the azo-based initiator include 2,2-azobisisobutyronitrile, 2,2-azobis-2-methylbutyronitrile, 2,2-azobis-2,4-dimethylvaleronitrile, 2,2-azobis-4-methoxy-2,4-dimethylvaleronitrile, dimethyl 2,2-azobis(2-methylpropionate) and 2,2-azobis(2-methylpropionamidine).dihydrochloride.

An amount of addition of the above-described polymerization initiator is ordinarily in the range of 0.05 to 5 parts by weight, and preferably in the range of 0.1 to 3 parts by weight, based on 100 parts by weight of polymerizable monomer.

Specific examples of the aqueous medium include water and a mixture of water and alcohol. An acidic substance or a basic substance may be added to the aqueous medium to control a pH value or ionic strength of this aqueous solvent, and thus such an aqueous solvent may also be used.

A ratio (weight ratio) of the polymerizable oily composition being the dispersed phase to the aqueous medium being the continuous phase is in the range of 100/(30 to 500), and preferably, in the range of 100/(30 to 300).

If the weight ratio of the components is within the above-described range, the resin particles having the uniform particle size distribution can be obtained.

A mean particle diameter of the oil-droplet particles dispersed into the aqueous medium is preferably in the range of 0.5 to 1,000 μm, further preferably, in the range of 0.5 to 100 μm, and particularly preferably, in the range of 1 to 50 μm.

Into the aqueous medium being the continuous phase, when necessary, inorganic particulates, an emulsifier and an aqueous polymerization inhibitor may be dispersed.

As the inorganic particulates that can be used in the present invention, any material can be used without particular restriction, as long as the material is publicly known as an inorganic-based suspension stabilizer. Specific examples include tertiary calcium phosphate, silica, titanium oxide and alumina. An amount of addition of such inorganic particulates is preferably as small as possible.

The emulsifier that can be used in the present invention is used as an auxiliary agent to the above-described sorbitan fatty acid ester, and specific examples include a polymer dispersant, a nonionic surfactant and an ionic surfactant.

Specific examples of the polymer dispersants include protein (gelatin); lecithin; water-soluble rubber such as gum arabic and tragacanth gum; sodium alginate; a cellulose derivative such as carboxymethyl cellulose, ethoxy cellulose and hydroxypropylmethyl cellulose; starch and a derivative thereof; polyvinylpyrrolidone; polyoxyethylene alkyl ether, polyoxyethylene alkylphenyl ether, polyoxyethylene lauryl ether, polyethylene glycol fatty acid ester, polyvinyl alcohol, a polyvinyl alcohol-based graft polymer (having polyvinylpyrrolidone and a derivative thereof grafted thereon); and cetyl alcohol.

Specific examples of the nonionic surfactants include polyoxyethylene alkyl ethers such as polyoxyethylene lauryl ether and polyoxyethylene stearyl ether; a polyoxyalkylene derivative such as polyoxyethylene alkylene alkyl ether; polyoxyalkylene alkenyl ether, polyoxyethylene alkylphenyl ether; glycerin fatty acid ester; polyoxyethylene fatty acid ester such as polyethylene glycol monolaurate and polyethylene glycol distearate; polyoxyethylene hydrogenated castor oil, polyoxyethylene alkylamine and alkyl alkanolamide.

Further, specific examples of the anionic surfactants include alkyl sulfate such as sodium lauryl sulfate and ammonium lauryl sulfate; polyoxyethylene alkyl sulfate, sodium dodecylbenzenesulfonate, sodium dialkylsulfosuccinate, ammonium polyoxyalkylene alkenyl ether sulfate, fatty acid salt and sodium salt of naphthalenesulfonic acid formalin condensate.

Furthermore, specific examples of cationic surfactants include alkylamine salt such as coconut amine acetate and stearylamine acetate; and quaternary ammonium salt such as lauryl trimethyl ammonium chloride, stearyltrimethylammonium chloride, cetyltrimethylammonium chloride and alkylbenzyldimethylammonium chloride.

Further, specific examples of amphoteric surfactants include alkyl betaine or alkylamine oxide, such as stearyl betaine, lauryl betaine and lauryldimethylamine oxide.

As examples of the aqueous polymerization inhibitor, a publicly known inhibitor can be used, such as sodium nitrite, potassium chromate, hydroquinone, ammonium thionate, ferric chloride and hydroxyethylamine. Use of the inhibitor allows suppression of unintended emulsion polymerization having anxiety of occurrence in the continuous phase during polymerization, thereby allowing use of resin particles having a further uniform particle size.

Further, when necessary, an antioxidant, an ultraviolet light absorber, an antifoaming agent, a near infrared absorber, a fluorescent brightener, a colorant component such as a pigment and a dye can also be used.

Specific examples of the antioxidants include a hindered phenol-based antioxidant, a hindered amine-based antioxidant, a phosphate-based antioxidant, a phosphite-based antioxidant and a sulfur-based antioxidant.

Specific examples of the ultraviolet light absorbers include a hindered amine-based light stabilizer, a benzotriazole-based polymerizable compound, a benzophenone-based light stabilizer, a triazine-based light stabilizer and a benzoate-based light stabilizer.

In Step (2), the emulsified liquid obtained in Step (1) is heated while stirring the liquid to allow suspension polymerization of the unsaturated group-containing polymerizable monomer in the oily composition. More specifically, the oil droplets formed of the unsaturated group-containing polymerizable monomer, the polymerization initiator and the above-described sorbitan fatty acid ester are dispersed thereinto, and then the resultant dispersion is heated while keeping a dispersion state by stirring or the like to perform suspension polymerization.

A stirring rate is preferably in the range of 0.2 to 2 m/s in terms of peripheral velocity of a stirring blade end, and heating temperature is preferably in the range of 50 to 95° C. The temperature is stepwise raised to allow polymerization in the range of 80 to 95° C., thereby allowing promotion of the reaction, too. The polymerization time is preferably in the range of approximately 1 to 24 hours. Specific examples of stirring means include means similar to the means in Step (1).

<Resin Particle Assemblage>

The thus obtained resin particle assemblage according to the present invention has properties as described below.

(I) A mean particle diameter of resin particles forming a resin particle assemblage is preferably in the range of 0.5 to 1,000 μm, further preferably, in the range of 0.5 to 100 μm, and particularly preferably, in the range of 1 to 50 μm. Uniformization of the mean particle diameter of resin particles forming the resin particle assemblage in the above-described range is associated with various factors such as selection of the unsaturated group-containing polymerizable monomer and the stirring rate, and in particular, such an excellent value is thought to be obtained as caused by use of the above-described sorbitan fatty acid ester in suspension polymerization. The resin particles being in the above-described mean particle diameter contain neither fine particles nor coarse particles, and can be preferably used in various applications.

More specifically, use of the above-described sorbitan fatty acid ester causes the ester moiety of sorbitan fatty acid ester to be buried inside the resin particles to strongly fix the sorbitan moiety onto the surface of resin particles. Therefore, in the resin particles forming the resin particle assemblage obtained according to the present invention, a surface active component to be eluted into the continuous phase becomes significantly low, and as a result, fine oil droplets are hard to be generated. Thus, a particle size distribution of the dispersion liquid becomes significantly narrow, and resin particles having high uniformity are obtained.

(II) A coefficient of variation (CV value) of the mean particle diameter of resin particles forming the resin particle assemblage is in the range of 30% or less, and preferably, in the range of 25% or less. The CV value is herein determined from an expression: 100×(particle diameter standard deviation/number mean particle diameter). The CV value being in the above-described value for the mean particle diameter of the resin particles forming the resin particle assemblage is associated with various factors such as selection of the unsaturated group-containing polymerizable monomer and the stirring rate, and in particular, such an excellent value is thought to be obtained as caused by use of the above-described sorbitan fatty acid ester in suspension polymerization. The resin particles having the CV value in the above-described range contain neither fine particles nor coarse particles, and can be preferably used in various applications.

(III) With regard to solvent redispersibility of the resin particle assemblage according to the present invention, a period of time is within 10 minutes in which a test tube is used to leave the resin particles to stand in toluene overnight to cause precipitation, and then rotate the test tube at a rotational rate of 10 rpm to cause complete redispersion of precipitated resin particles. Such a value is obtained as redispersibility into the solvent, as mentioned above, due to burial of the ester moiety constituting the above-described sorbitan fatty acid ester inside the resin particles and presence of a large number of sorbitan moieties bonded with the ester moiety on the surface of resin particles. If the redispersibility into solvent is in the above-described range, redispersion of settled particles is allowed over time, thereby allowing formation of agglomerated particles to reduce a problem caused by settlement of the particles, or the like. Furthermore, the particles have an advantage of ease of handling or the like, and are further preferably used in applications of a light diffusion sheet, an antiglare film, a coating material or the like.

A reason why the resin particles related to the present invention show the above-described physical properties is thought as described below.

The above-described sorbitan fatty acid ester controls interfacial energy between the aqueous medium and the oil droplets. The above-described sorbitan fatty acid ester has very low solubility in the aqueous medium serving as the continuous phase, and therefore has low existence probability in the continuous phase. Therefore, oil droplets having a small particle diameter are thought to become hard to be formed in an emulsification step for forming the emulsified liquid. Further, the sorbitan moiety of the above-described sorbitan fatty acid ester inside the oil droplets being the dispersed phase, more specifically, on the surface of the oil droplets is thought to be localized on a liquid/liquid interface with the continuous phase, thereby causing a decrease in interfacial free energy, resulting in having an effect on preventing the liquid droplets formed by emulsification from reuniting (agglomeration) to suppress formation of oil droplets having a large particle diameter. Thus, the resin particle assemblage having a narrow particle diameter distribution and having a uniform particle size is obtained. Moreover, the above-described sorbitan fatty acid ester is a compound having high affinity with a general organic binder or organic medium, and the compounds are unevenly distributed on the surface of resin particles, and therefore the resin particles are thought to have excellent redispersibility into the organic binder or organic solvent.

The resultant resin particle assemblage can be used for cosmetics, an optical material, a molding resin, film anti-blocking, a coating material and so forth.

[Method for Controlling Particle Size in Resin Particle Assemblage]

A method for controlling a particle size in a resin particle assemblage according to the present invention is completed, through a step for adding an aqueous medium to a polymerizable oily composition prepared by adding a sorbitan fatty acid ester having no polyoxyalkylene group to 100 parts by weight of unsaturated group-containing polymerizable monomer, in which a coefficient of variation (CV value) of a mean particle diameter of resin particles becomes 30% or less, and further adding a polymerization initiator, and stirring the resultant mixture under strong stirring to prepare an emulsified liquid in which the aqueous medium is emulsified into the polymerizable oily composition, by performing suspension polymerization of the unsaturated group polymerizable monomer contained in the polymerizable oily composition, thereby preparing the resin particles in which the coefficient of variation (CV value) of the particle diameter of particles of the polymerizable oily composition becomes 30% or less.

A mean particle diameter of resin particles forming the above-described resin particle assemblage is preferably in the range of 0.5 to 1,000 μm, further preferably, in the range of 0.5 to 100 μm, and particularly preferably, in the range of 1 to 50 μm.

The unsaturated group-containing polymerizable monomer, the sorbitan fatty acid ester or the like is as described above already.

EXAMPLES

Next, the present invention is described in more detail by showing Examples according to the present invention, but the present invention is not limited thereby.

Example 1

Into a 1 L-volume glass flask, 70 parts by weight of methyl methacrylate and 30 part by weight of trimethylolpropane triacrylate were charged, and sufficiently mixed. Then, 0.7 part by weight of sorbitan laurate (HLB value: 8.6) was added hereto, and the resultant mixture was stirred and dissolved. Subsequently, 0.5 part by weight of lauroyl peroxide was added thereto, and the resultant mixture was sufficiently stirred and dissolved to arrange a polymerizable oily monomer solution.

To the above-described polymerizable oily monomer solution, 80 parts by weight of ion exchanged water were added, and the resultant mixed phase was stirred at 13,000 rpm (peripheral velocity: 19.2 m/s) for 1 minute using a homomixer to give an emulsified liquid. To the emulsified liquid, an aqueous solution obtained by dissolving 1.0 part by weight of polyvinyl alcohol (trade name: PVA-224, manufactured by Kuraray Co., Ltd.) into 180 parts by weight of tap water was added to allow reaction at 60° C. for 3 hours under an inert gas atmosphere to give a dispersion liquid of resin particles.

The resultant dispersion liquid of resin particles was dehydrated by suction filtration, and then subjected to tray drying at 90° C. for 3 hours, and the resultant material was pulverized to give a resin particle assemblage.

Example 2

Into a 1 L-volume glass flask, 70 parts by weight of methyl methacrylate and 30 part by weight of trimethylolpropane triacrylate were charged, and sufficiently mixed. Then, 0.6 part by weight of sorbitan laurate (HLB value: 8.6) was added hereto, and the resultant mixture was stirred and dissolved. Subsequently, 0.5 part by weight of lauroyl peroxide was added thereto, and the resultant mixture was sufficiently stirred and dissolved to arrange a polymerizable monomer solution.

To the above-described polymerizable monomer solution, 80 parts by weight of ion exchanged water, 0.3 part by weight of colloidal silica and 0.01 part by weight of polyvinyl alcohol (trade name: PITZCOL V-7154, manufactured by Dai-Ichi Kogyo Seiyaku Co., Ltd.) were added, and the resultant mixed phase was stirred at 13,000 rpm (peripheral velocity: 19.2 m/s) for 1 minute using a homomixer to give an emulsified liquid. To the emulsified liquid, an aqueous solution prepared by dissolving 1.0 part by weight of polyvinyl alcohol (trade name: PVA-224, manufactured by Kuraray Co., Ltd.) into 180 parts by weight of tap water was added to allow reaction at 60° C. for 3 hours under an inert gas atmosphere to give a dispersion liquid of resin particles.

The resultant dispersion liquid of resin particles was dehydrated by suction filtration, and then subjected to tray drying at 90° C. for 3 hours, and the resultant material was pulverized to give a resin particle assemblage.

Example 3

To a 1 L-volume glass flask, 70 parts by weight of methyl methacrylate, 30 parts by weight of trimethylolpropane triacrylate and 0.3 part by weight of 4-hydroxybutyl acrylate were charged, and sufficiently mixed. Then, 0.3 part by weight of sorbitan laurate (HLB value: 8.6) was added hereto, and the resultant mixture was stirred and dissolved. Subsequently, 0.5 part by weight of lauroyl peroxide was added thereto, and the resultant mixture was sufficiently stirred and dissolved to prepare a polymerizable monomer solution.

To the above-described polymerizable monomer solution, 60 parts by weight of ion exchanged water, 0.1 part by weight of colloidal silica and 0.1 part by weight of polyvinyl alcohol (trade name: PITZCOL V-7154, manufactured by Dai-Ichi Kogyo Seiyaku Co., Ltd.) were added, and the resultant mixed phase was stirred at 8,000 rpm (peripheral velocity: 11.7 m/s) for 1 minute using a homomixer to give an emulsified liquid. To the emulsified liquid, an aqueous solution prepared by dissolving 1.0 part by weight of polyvinyl alcohol (trade name: PVA-224, manufactured by Kuraray Co., Ltd.) into 200 parts by weight of tap water was added to allow reaction at 60° C. for 3 hours under an inert gas atmosphere to give a dispersion liquid of resin particles.

The resultant dispersion liquid of resin particles was dehydrated by suction filtration, and then subjected to tray drying at 90° C. for 4 hours, and the resultant material was pulverized to give a resin particle assemblage.

Example 4

A resin particle assemblage was obtained in a manner similar to the operation in Example 1 except that sorbitan laurate was changed to sorbitan monooleate (HLB value: 4.3) in Example 1.

Example 5

A resin particle assemblage was obtained in a manner similar to the operation in Example 3 except that sorbitan laurate was changed to sorbitan trioleate (HLB value: 1.8), and 0.1 part by weight of colloidal silica was changed to 1.0 part by weight thereof in Example 3.

Example 6

Into a 1 L-volume glass flask, 95 parts by weight of methyl methacrylate and 5 parts by weight of ethylene glycol dimethacrylate were charged, and sufficiently mixed. Then, 0.6 part by weight of sorbitan laurate (HLB value: 8.6) was added hereto, and the resultant mixture was stirred and dissolved. Subsequently, 0.5 part by weight of lauroyl peroxide was added thereto, and the resultant mixture was sufficiently stirred and dissolved to arrange a polymerizable monomer solution.

To the above-described polymerizable monomer solution, 80 parts by weight of ion exchanged water, 0.3 part by weight of colloidal silica and 0.01 part by weight of polyvinyl alcohol (trade name: PITZCOL V-7154, manufactured by Dai-Ichi Kogyo Seiyaku Co., Ltd.) were added, and the resultant mixed phase was stirred at 13,000 rpm (peripheral velocity: 19.2 m/s) for 1 minute using a homomixer to give an emulsified liquid. To the emulsified liquid, an aqueous solution prepared by dissolving 1.0 part by weight of polyvinyl alcohol (trade name: PVA-224, manufactured by Kuraray Co., Ltd.) into 180 parts by weight of tap water was added to allow reaction at 60° C. for 3 hours under an inert gas atmosphere to give a dispersion liquid of resin particles.

The resultant dispersion liquid of resin particles was dehydrated by suction filtration, and then subjected to tray drying at 90° C. for 3 hours, and the resultant material was pulverized to give a resin particle assemblage.

Example 7

A resin particle assemblage was obtained in a manner similar to the operation in Example 1 except that 0.3 part of methacrylic acid glycidyl ether was added to the charged monomer in Example 1.

Example 8

Into a 1 L-volume glass flask, 95 parts by weight of styrene and 5 parts of divinylbenzene were charged, and sufficiently mixed. Then, 0.2 part by weight of sorbitan laurate (HLB value: 8.6) was added hereto, and the resultant mixture was stirred and dissolved. Subsequently, 0.75 part by weight of benzoyl peroxide was added thereto, and the resultant mixture was sufficiently stirred and dissolved to arrange a polymerizable monomer solution.

To the above-described polymerizable oily monomer solution, 60 parts by weight of ion exchanged water and 0.3 part by weight of colloidal silica were added, and the resultant mixed phase was stirred at 8,000 rpm (peripheral velocity: 11.7 m/s) for 5 minutes using a homomixer to give an emulsified liquid. To the emulsified liquid, an aqueous solution prepared by dissolving 1.0 part by weight of polyvinyl alcohol (trade name: PVA-224, manufactured by Kuraray Co., Ltd.) into 200 parts by weight of tap water was added to allow reaction at 76° C. for 6 hours under an inert gas atmosphere to give a dispersion liquid of resin particles.

The resultant dispersion liquid of resin particles was dehydrated by suction filtration, and then subjected to tray drying at 80° C. for 3 hours, and the resultant material was pulverized to give a resin particle assemblage.

Example 9

Into a 1 L-volume glass flask, 70 parts by weight of methyl methacrylate and 30 parts by weight of trimethylolpropane triacrylate were charged, and sufficiently mixed. Then, 0.7 part by weight of sorbitan laurate (HLB value: 8.6) was added hereto, and the resultant mixture was stirred and dissolved. Subsequently, 0.5 part by weight of lauroyl peroxide was added thereto, and the resultant mixture was sufficiently stirred and dissolved to arrange a polymerizable oily monomer solution.

To the above-described polymerizable oily monomer solution, 80 parts by weight of ion exchanged water and 5 parts by weight of 0.1% aqueous ammonia were added, and the resultant mixed phase was stirred at 13,000 rpm (peripheral velocity: 19.2 m/s) for 1 minute using a homomixer to give an emulsified liquid. To the emulsified liquid, an aqueous solution prepared by dissolving 1.0 part by weight of polyvinyl alcohol (trade name: PVA-224, manufactured by Kuraray Co., Ltd.) into 180 parts by weight of tap water was added to allow reaction at 60° C. for 3 hours under an inert gas atmosphere to give a dispersion liquid of resin particles.

The resultant dispersion liquid of resin particles was dehydrated by suction filtration, and then subjected to tray drying at 90° C. for 3 hours, and the resultant material was pulverized to give a resin particle assemblage.

Comparative Example 1

Into a 1 L-volume glass flask, 70 parts by weight of methyl methacrylate and 30 parts by weight of trimethylolpropane triacrylate were charged, and sufficiently mixed. Then, 0.3 part by weight of lauroyl peroxide was added thereto, and the resultant mixture was sufficiently stirred and dissolved to arrange a polymerizable monomer solution.

To the above-described polymerizable monomer solution, 80 parts by weight of ion exchanged water, 0.5 part by weight of colloidal silica and 0.01 part by weight of polyvinyl alcohol (trade name: PITZCOL V-7154, manufactured by Dai-Ichi Kogyo Seiyaku Co., Ltd.) were added, and the resultant mixed phase was stirred at 13,000 rpm (peripheral velocity: 19.2 m/s) for 1 minute using a homomixer to give an emulsified liquid. To the emulsified liquid, an aqueous solution prepared by dissolving 1.0 part by weight of polyvinyl alcohol (trade name: PVA-224, manufactured by Kuraray Co., Ltd.) into 180 parts by weight of tap water was added to allow reaction at 60° C. for 3 hours under an inert gas atmosphere to give a dispersion liquid of resin particles.

The resultant dispersion liquid of resin particles was dehydrated by suction filtration, and then subjected to tray drying at 90° C. for 4 hours, and the resultant material was pulverized to give a resin particle assemblage.

Comparative Example 2

A resin particle assemblage was obtained in a manner similar to the operation in Example 1 except that sorbitan laurate was changed to polyoxyethylenesorbitan laurate in Example 1.

In the resin particle assemblage obtained, a number of finer resin particles were generated in comparison with a mean particle size.

Comparative Example 3

Into a 1 L-volume glass flask, 70 parts by weight of methyl methacrylate and 30 parts by weight of trimethylolpropane triacrylate were charged, and the resultant mixture was sufficiently mixed, 0.5 part by weight of lauroyl peroxide was added hereto, and the resultant mixture was sufficiently stirred and dissolved to arrange a polymerizable monomer solution.

To the above-described polymerizable monomer solution, an aqueous medium prepared by dissolving 1.0 part by weight of polyvinyl alcohol (trade name: PVA-420, manufactured by Kuraray Co., Ltd.) into 260 parts by weight of ion exchanged water was added, and the resultant mixed phase was stirred at 13,000 rpm (peripheral velocity: 19.2 m/s) for 1 minute using a homomixer to give an emulsified liquid. The emulsified liquid was allowed to react at 60° C. 3 hours under an inert gas atmosphere to give a dispersion liquid of resin particles.

The resultant dispersion liquid of resin particles was dehydrated by suction filtration, and then subjected to tray drying at 90° C. for 4 hours, and the resultant material was pulverized to give a resin particle assemblage.

In the resin particle assemblage obtained, a number of finer resin particles were generated in comparison with a mean particle size.

Comparative Example 4

Monodispersed crosslinked acrylic resin particles (trade name: MX-1000, manufactured by Soken Chemical & Engineering Co., Ltd.) prepared by seed polymerization were used.

Table 1 shows the results obtained in Examples 1 to 5 and Comparative Examples 1 to 4.

[Evaluation Method]

<Mean Particle Diameter>

Adjustment of sample for measurement: A material obtained by dispersing, for 10 minutes using an ultrasonic disperser, a system in which 0.75 g of resin particle assemblage obtained by the method described in Example was weighed, and 0.05 g of sodium dodecylbenzenesulfonate and 50 g of pure water were added thereto was taken as a sample for measurement.

Measurement was carried out using:

a measuring apparatus; FPIA3000 (flow particle image analyzer, manufactured by Sysmex Corporation), and under:

measurement conditions; LPF mode when a particle diameter was in the range of 10 μm or more; HPF mode when the diameter was in the range of 10 μm or less. Then, measurement was carried out for the number of 50,000 pieces. A volume mean particle diameter determined therefrom was taken as a mean particle diameter. Moreover, as a CV value, an analyzed value by an equivalent circle diameter (in terms of number of particles) was used.

<Redispersibility>

In a test tube, 0.6 g of resin particle assemblage and 4 g of toluene were weighed to allow dispersion using ultrasonic waves. After dispersion, an upper part of the test tube was closed up with a rubber stopper, and the resultant mixture was allowed to stand for 24 hours to precipitate the resin particles. Then, the test tube was vertically rotated at a rotational rate of 10 rpm, and a period of time required until a precipitate disappeared (the resin particles were redispersed) was measured, and evaluation was performed as described below.

○: within 10 minutes, Δ: 10 to 30 minutes, x: needing 30 minutes or more.

TABLE 1

|  | Mean Particle Diameter (μm) | CV Value | Redispersibility into Toluene |
|---|---|---|---|
| Example 1 | 10.9 | 18.9 | ○ |
| Example 2 | 10.5 | 21.4 | ○ |
| Example 3 | 20.0 | 19.8 | ○ |
| Example 4 | 17.1 | 20.9 | ○ |
| Example 5 | 12.4 | 21.0 | ○ |
| Example 6 | 19.7 | 17.8 | ○ |
| Example 7 | 10.3 | 25.5 | ○ |
| Example 8 | 23.0 | 29.2 | ○ |
| Example 9 | 3.9 | 28.3 | ○ |
| Comparative Example 1 | 10.7 | 35.0 | x |
| Comparative Example 2 | 7.1 | 59.2 | x |
| Comparative Example 3 | 15.5 | 58.3 | x |
| Comparative Example 4 | 9.4 | 9.4 | x |

The invention claimed is:

1. A resin particle assemblage, wherein an ester moiety constituting a sorbitan fatty acid ester having no polyoxyalkylene group is buried in the resin particles,
   wherein polymerizable monomers constituting the resin particle comprise a polyfunctional monomer and at least one (meth)acryl-based monomer selected from the group consisting of methyl (meth)acrylate, ethyl (meth)acrylate, propyl (meth)acrylate, butyl (meth)acrylate, pentyl (meth)acrylate, hexyl (meth)acrylate, 2-ethylhexyl (meth)acrylate, octyl (meth)acrylate, nonyl (meth)acrylate, decyl (meth)acrylate, dodecyl (meth)acrylate, cyclohexyl (meth)acrylate, isobornyl (meth)acrylate, phenyl (meth)acrylate, benzyl (meth)acrylate, phenoxyethyl (meth)acrylate, methoxyethyl (meth)acrylate, ethoxyethyl (meth)acrylate, propoxyethyl (meth)acrylate, butoxyethyl (meth)acrylate and ethoxypropyl (meth)acrylate, and
   wherein, in 100 parts by weight of total polymerizable monomers, the polyfunctional monomer is used in the range of 1 to 50 parts by weight, and the (meth)acryl-based monomer is used in 50 parts by weight or more.

2. The resin particle assemblage according to claim 1, wherein an HLB value of the sorbitan fatty acid ester having no polyoxyalkylene group is in the range of 1 to 9.

3. The resin particle assemblage according to claim 1, wherein a mean particle diameter of the resin particles is in the range of 0.5 to 1,000 μm.

4. The resin particle assemblage according to claim 2, wherein a mean particle diameter of the resin particles is in the range of 0.5 to 1,000 μm.

* * * * *